United States Patent [19]

Hawe et al.

[11] Patent Number: 4,740,325
[45] Date of Patent: * Apr. 26, 1988

[54] THERMAL ENERGY STORAGE COMPOSITIONS

[75] Inventors: Malcolm Hawe; David Marshall; John R. Walker, all of West Yorkshire, England

[73] Assignee: Allied Colloids Limited, England

[*] Notice: The portion of the term of this patent subsequent to Jun. 16, 2004 has been disclaimed.

[21] Appl. No.: 34,599

[22] Filed: Apr. 6, 1987

Related U.S. Application Data

[63] Continuation of Ser. No. 816,686, Jan. 6, 1986, Pat. No. 4,673,520, which is a continuation of Ser. No. 638,938, Aug. 9, 1984, abandoned, which is a continuation-in-part of Ser. No. 465,379, Feb. 10, 1983, abandoned.

[51] Int. Cl.$^4$ .................................................. C09K 5/06
[52] U.S. Cl. ................................... 252/70; 165/104.11
[58] Field of Search ...................... 252/70; 165/104.11

[56] References Cited

U.S. PATENT DOCUMENTS

| 3,720,198 | 3/1973 | Laing et al. | 252/70 |
| 3,915,921 | 10/1975 | Schlatzer, Jr. | 526/317 |
| 4,273,667 | 6/1981 | Kent et al. | 252/70 |
| 4,341,649 | 7/1982 | Burns et al. | 252/70 |
| 4,423,199 | 12/1983 | Chang et al. | 524/553 |

FOREIGN PATENT DOCUMENTS

| 56-143283 | 11/1981 | Japan . | |
| 57-139169 | 8/1982 | Japan | 252/70 |
| 58-05386 | 1/1983 | Japan . | |

*Primary Examiner*—Robert Wax
*Attorney, Agent, or Firm*—Ostrolenk, Faber, Gerb & Soffen

[57] ABSTRACT

A thermal energy storage composition is formed of a thermal energy storage hydrate and a solid, water swellable, thermally conducting polymer by blending particles of the polymer with the thermal energy storage hydrate.

20 Claims, No Drawings

THERMAL ENERGY STORAGE COMPOSITIONS

This application is a continuation of U.S. application Ser. No. 816,686, filed Jan. 6, 1986 and now U.S. Pat No. 4,673,520, which is a continuation of U.S. application Ser. No. 638,938, filed Aug. 9, 1984, now abandoned which is a continuation-in-part of U.S. application Ser. No. 465,379 filed Feb. 10, 1983 now abandoned.

It is known to store thermal energy using a thermal energy storage material that is a compound, or a mixture of compounds, that will reversibly undergo a change of state with accompanying release or storage of latent heat and which optionally includes one or more promoters, such as nucleating agents, for the change of state. An important class of these thermal energy storage compounds are those that have a transition temperature at which the compound passes from a first energy state at which it is hydrated to a second energy state, at which it is less hydrated. In the second energy state the compound may be anhydrous. The water that is driven from the compound on passing to the second energy state will generally dissolve some of the compound, for instance to form a saturated salt solution in which the anhydrous or other low hydrate is dispersed.

Thermal energy storage hydrates are generally wholly solid below their transition temperature, but are generally heterogeneous above their transition temperature, comprising a liquid phase and at least one solid phase that is of a different density from the liquid phase and that therefore tends to separate from the solid phase. For instance a high hydrate (e.g., $Na_2SO_4.10H_2O$) will melt when its temperature rises past its transition temperature to form a low hydrate (e.g., $NaSO_4$) and water. The low hydrate dissolves into the water but unless the solubility of the low hydrate is very high, the amount of water will be insufficient to dissolve all the low hydrate and, as a result, an incongruent mixture is formed of solid low hydrate in a saturated solution of the low hydrate. Even if the amount of water were to permit total dissolution, there may still be a solid phase since the system generally includes insoluble nucleating agent.

To minimise the separation of the solid and liquid phases it is known to provide a thermal energy storage composition in which the storage material is dispersed in a viscous liquid or other thickened composition. Such thickened compositions are discussed in, for example, U.S. Pat. No. 3,986,969. As explained in that patent the resultant compositions were often not entirely satisfactory, for instance because the thickening action of the thickening agent tends to deteriorate during use, and also the thickening systems discussed in that patent tend to be incapable of preventing separation of solid phase present in fused thermal energy storage material.

In an attempt at overcoming these difficulties it is proposed in British Pat. No. 1,584,559 and U.S. Pat. No. 4,273,667 to mix the hydrate with an aqueous solution of a linear acrylic polymer, and then to cross-link the polymer by particular mechanisms described in those patents, so as to form a hydrogel, and then to introduce the hydrogel into the heat exchanger in which it is to be used.

It can be difficult to fill the viscous hydrogel satisfactorily into the heat exchange vessels that are to be used, particularly since these can be of complex shape. It can also be difficult to achieve uniform blending of the salt with the polymer solution because of the very high viscosity of such mixtures.

In our European patent publication no. 0087859 we have described various ways of making thermal energy storage compositions that avoid these difficulties. In one, a low viscosity solution of polymerisable monomer is blended with a low viscosity solution of hydrate and polymerisation is completed in the heat exchanger. In another the composition is particulate and the storage hydrate is held in particles of a solid thermally conducting matrix of the polymeric material formed by polymerisation in the presence of a solution of the hydrate.

If the hydrate has low water solubility (e.g., anhydrous sodium pyrophosphate), use of a solution of the hydrate necessarily introduces a large amount of water into the polymerisation mixture. In order that the resultant gel is sufficiently strong to be handled and/or to prevent separation during use in the heat exchanger it is necessary to increase the amount of polymer in the mix from the normal 5 to 10% up to, say 20%. This therefore reduces the thermal energy storage capacity of the composition.

Another difficulty with polymerising in the presence of the hydrate is that the hydrate must be inert to the polymerisation and to the monomers. This has precluded the development of a polymerisation technique for sodium thiosulphate pentahydrate, which has a transition temperature at 48° C.

A thermal energy storage composition according to the invention comprises discrete or partially fused particles of a solid, water-swellable, thermally conducting polymer and a thermal energy storage compound that has a transition temperature at which it passes from a first energy state at which it is hydrated to a second energy state at which it is less hydrated and that is intimately mixed with, but substantially outside, the polymer particles, the polymer being capable of reversibly absorbing and desorbing water of hydration of the compound whilst remaining as a solid.

The composition may be formed by intimately mixing particles of water-swellable polymer with the storage energy compound, the mixing being conducted in the presence of water to serve as the water of hydration when the compound is in the said hydrated state. The water that is present during the mixing may be chemically combined with the compound, as water of hydration, or may be free water, for instance that has been absorbed into the polymer particles or that is added to a dry mix of the compound and the particles, whereupon it will become absorbed into the particles.

The amount of water that is present during the mixing is substantially only that amount of water that is required to provide the said hydrated state of the compound. If there is insufficient water, then some of the compound will be incapable of changing from one state to another. If there is excess water, the strength of the swollen polymer may be reduced undesirably. Preferably therefore the amount of water is 100% of the stoichiometric requirement but minor variations can be tolerated, for instance in the range 80 to 120% or sometimes up to 150% of the stoichiometric.

The preferred way of forming the compound initially is to make it as a dry composition consisting of an intimate mixture of particles of the hydrate (optionally in an anhydrous state) and particles of polymer, generally in a substantially anhydrous and non-swollen state. Such a composition can be made by dry mixing. In order to render this preliminary composition suitable for use in a heat exchanger, it is necessary to provide sufficient water. This can be provided by mixing the required amount of water into an anhydrous mix of polymer and salt. The hydrate (optionally in an anhydrate state) can be mixed with polymeric particles that have already been swollen with the requisite amount of water for complete hydration of the hydrate.

The composition can also be provided by mixing anhydrous polymer with a salt in its fully hydrated form, but below its transition temperature, in order that it is present as a solid. Alternatively the final mix can be made by mixing dry polymer particles with a solution of the salt, if, for example, the temperature is higher than the transition temperature of the chosen compound.

Since the blending always involves blending the thermal energy storage compound with polymer particles (often gel particles) rather than a continuous polymeric viscous phase, the invention avoids many of the blending difficulties associated with the process described in, for instance, British Pat. No. 1,584,559 and U.S. Pat. No. 4,273,667. Since the compound is blended with performed polymer (in particulate form) rather than with reactive monomer or prepolymer, the invention avoids the need to polymerise the presence of salt (as in European patent publication no. 87859). Thus the salt can be selected without regard to its effect on the polymerisation of the monomer or the amount of water that has to be associated with that salt. In particular, the invention avoids the disadvantage of having a higher than necessary proportion of polymer in systems using salts which show a high degree of incongruency. The necessary quantity of polymer in this context refers to the amount of polymer which is required to stabilise the system against settlement of incongruent material.

The polymer is initially in particulate form, but in the presence of the water associated with the hydrate, and in particular after several reversible phase changes, the particles will fuse to one another to a greater or lesser extent. The polymer must remain as a solid at all times during the phase change as otherwise it will permit separation of the components of the heterogeneous hydrates.

It is therefore necessary that the polymer should not be converted, when it swells, into a fluid or soft gel that is insufficient to prevent this separation. The polymer can be water soluble provided the viscosity of the resultant gel during use always prevents separation of the heterogeneous phases. If a water soluble polymer is to be used, it must therefore be designed to give a very rigid gel. Water soluble and insoluble polymers that have this property, even in the presence of salt solution, are known and are described in, for instance, U.S. Pat. Nos. 3,915,921 and 4,423,199 and in European patent publication Nos. 3235, 13836, 48094 and 63018.

Other suitable polymers are amphoteric polymers, that is to say polymers containing anionic and cationic groups within the molecule, or amphoteric polymer blends, as such amphoteric products can give particularly strong gels. Other suitable polymers are graft copolymers of carbohydrates such as starch on to acrylamide or of acrylamide on to a carbohydrate. Such polymers are generally water insoluble.

The polymer can initially be water soluble and can be converted to an insoluble form during use. For instance the polymer can be a polymer containing carboxylic groups that will be cross linked, to render the polymer insoluble, by contact with a polyvalent metal, such as calcium or magnesium ions, during use. Alternatively, the polymer can be cross linked by this mechanism before blending with the hydrate. Another form of polymer is a polyimide that can be formed either before blending or during use by condensing adjacent amide groups on a polyamide.

Best results are generally achieved when the polymer is insoluble and cross linked during use, and preferably before blending. Not only does the cross linking strengthen the gel but it also creates a physical barrier to the migration of the heterogeneous phases. The cross linking is preferably by covalent bonding with an ethylenically unsaturated cross linking agent. Generally the weight of cross linking monomers in the polymer is from 0.001 to 2 or 3% by weight, generally 0.2 to 1% by weight. The use of cross linked polymers has the particular advantage that the particles have a strong gel structure that can withstand high shear applied during mixing of swollen particles with the hydrate before use.

The polymer particles will, when dry, generally be from 0.001 to 10 mm in size, most usually 0.05 to 1 mm. They may be formed, generally in the absence of thermal energy storage hydrate, by conventional techniques, for instance, by reverse phase suspension polymerisation followed by removal from the continuous phase in which they are formed, generally after dehydration, or by gel polymerisation followed by comminution, generally after dehydration.

The polymer is preferably formed from ethylenically unsaturated monomers, especially acrylic monomers. Suitable acrylic monomers include acrylic and methacrylic acid and their salts, acrylic and methacrylic esters which give water soluble polymers and acrylic and methacrylic amides, N-substituted acrylamides and methacrylamides which give water soluble polymers, preferred monomers being acrylamide, sodium acrylate and dialkyl amino alkyl (meth) acrylates including quaternised derivatives of the dialkylamino compounds, for instance quaternised dimethylaminoethyl acrylate. The polymer may be a Mannich base of polyacrylamide. Copolymers of two or more of the described monomers are often preferred.

Other polymers that may be used include polymers (including copolymers) of vinyl pyrrolidinone or vinyl sulphonic acids (that may be polymerised from aqueous solutions as described above) and polymers formed from dimethylamine and epichlorhydrin.

Suitable cross-linking agents for use with acrylic monomers, include methylene bisacrylamide, methylol acrylamide and soluble polethylene glycol diesters, aldehydes such as glutaraldehyde or formaldehyde or, when the polymer contains carboxylic or sulphonic acid groups, cations of polyvalent metals.

Polymerisation of acrylic monomers may be by, for instance, thermal or redox systems, including thermally decomposing initiators such as ammonium persulphate.

If the storage hydrate includes polyvalent cations, it is preferred that the polymer should be non-ionic or cationic, as is described in European patent publication No. 87859. This avoids uncontrolled insolubilisation of the polymer by uncontrolled cross-linking during use.

The polymer must be thermally conducting by which we mean that it must not prevent the transfer of thermal energy to such an extent as to render the composition ineffective. Generally any of the polymers described above are thermally conducting, especially if they are in a non-foamed form.

The amount of polymer, based on the combined weight of polymer and storage hydrate, should be as low as possible and is generally below 25% and preferably below 20% by weight. Normally it is at least 1% and most usually from 5 to 15%, preferably 5 to 10%, by weight.

The storage hydrate is generally an inorganic hydrate that will undergo a change of state, including a change in the degree of hydration, at a transition temperature that is preferably between 5° C. and 100° C. The latent heat is preferably above 30 and generally above 50, most preferably from 70 to 150, KWh/m$^3$.

The storage hydrate may be sodium sulphate, calcium chloride and the other inorganic hydrates disclosed in, for instance, the aforementioned British Pat. No. 1,584,559, U.S. Pat. No. 4,273,667 and European Pat. No. 87559. However, the invention is of particular value when the hydrate is sodium pyrophosphate or other salt which shows a high degree of incongruency, or when the hydrate is a thiosulphate or other material that is a redox or other chemically active material that will interfere with the polymerisation reaction if it is present during polymerisation as described in European patent publication no. 87859.

The compositions of the invention may be used in heat exchange tubes or other vessels in known manner. When the composition is above the transition temperature, the polymer particles will be swollen with saturated salt solution and there may be further salt solution between the particles and there will generally also be solid salt, for instance anhydrous salt, either between the particles or trapped on the particles. When the composition is below the transition temperature, the polymer particles will be less hydrated (and may be substantially anhydrous) and will be present either as substantially individual particles or as porous polymer network of fused particles and there will be crystalline hydrated salt either entirely separate from the polymer particles or held on the surfaces of the polymer particles. Thus the salt will be substantially outside the polymer paticles in that if it is in the particles at all it will be concentrated at or towards their surfaces whereas in the particular systems described in European patent publication 87859 it was homogeneously distributed throughout each polymer particle.

The following are some examples of the invention.

EXAMPLE 1

Sodium sulphate decahydrate (100 g) was mixed thoroughly with 10 g of particles of a copolymer formed from 90 parts sodium acrylate, 10 parts acrylamide and 0.25% methylenebisacrylamide (based on the total polymer). A small quantity of borax (2 g) was added to this mixture. The composition was then loaded into a heat exchanger and heated. This caused the inorganic hydrate to melt with the release of water and anhydrous salt. The release of water of crystallisation caused the polymer to swell which in turn prevented the anhydrous solids from settling. On cooling, latent heat of crystallisation was released at 31° C. This cycle was repeated many times with no evidence of a drop off in the amount of heat released on cooling.

EXAMPLE 2

6.2 g of particles of copolymer formed from 60 parts acrylamide and 40 parts sodium acrylate and 0.025% methylenebisacrylamide (based on total polymer) were added to 45 g of water. This caused the polymer to swell. 79 g of anhydrous sodium thiosulphate was then mixed into the swollen polymer gel and the mixture was loaded into a heat exchanger tube and then subjected to a large number of heating and cooling cycles. This indicated that the latent heat of fusion of the salt could be recovered quite satisfactorily on cooling. Some tendency for the salt to supercool before crystallisation occurred was observed in this example.

EXAMPLE 3

119.3 g of anhydrous sodium pyrophosphate was mixed with 10 g of the dry polymer used in Example 2. To this mixture was added 80.7 g of water, with mixing to ensure reasonable distribution of the water. The sample was then loaded into a heat exchanger tube and subjected to a number of heating/cooling cycles which showed that latent heat of fusion of the salt could be recovered on cooling at about 70° C. The sample performed in a highly satisfactory manner with no evidence of a deterioration in the amount of heat which could be recovered.

EXAMPLE 4

219 g of calcium chloride hexahydrate was mixed with 13 g of a particulate copolymer formed from 50 parts acrylamide and 50 parts dimethylaminoethylacrylate quaternised with dimethylsulphate and 0.05% methylene bisacrylamide (based on the total polymer). The sample was then subjected to a large number of heating/cooling cycles which showed that the heat uptake on melting could be recovered during crystallisation. The sample showed no evidence of deterioration in thermal efficiency during the course of these experiments.

We claim:

1. In a method of providing a heat exchange vessel with a filling of a thermal energy storage composition comprising an intimate mixture of (a) a thermal energy storage compound that is a hydrate and that has a transition temperature at which the hydrate passes from a first energy state in which it is a solid to a second, less hydrated, energy state in which it comprises solid and liquid phases and (b) a solid, water swellable, water insoluble, thermally conducting, cross-linked polymer that is capable of reversible absorbing and desorbing water of hydration of the said hydrate while remaining as solid, the improvement comprising forming the composition by blending particles of the said hydrate in its first energy state with the said polymer in the form of substantially dry particles up to 1 mm in size, and with substantially the amount of water required to provide the said first energy state of the hydrate wherein the water that is present during blending is chemically combined with the hydrate as water of hydration, and filling the composition into the vessel, whereby the polymeric material will prevent separation of the said solid and liquid phases of the hydrate in the vessel during reversible and repeated storage and release of thermal energy.

2. A method according to claim 1 in which the polymer particles are of polymer formed from ethylenically unsaturated monomers and the cross-linking agent is an ethylenically unsaturated cross-linking agent.

3. A method according to claim 2 in which the ethylenically unsaturated monomers comprise acrylic monomers.

4. A method according to claim 3 in which the thermal energy storage compound is a sodium pyrophosphate hydrate.

5. A method according to claim 3 in which the thermal energy storage compound is a sodium thiosulphate hydrate.

6. A method according to claim 1 in which the hydrate is sodium pyrophosphate hydrate or sodium thiosulphate hydrate.

7. A method according to claim 1 in which the substantially dry particles are 0.05 to 1 mm in size.

8. A method according to claim 1 in which the amount of polymer, based upon the combined weight of polymer and hydrate is at least 1% and below 25% by weight.

9. A method according to claim 8 in which the amount of polymer is from 5 to 15% by weight.

10. A method according to claim 9 in which the amount of polymer is 5 to 10% by weight.

11. In a method of providing a heat exchange vessel with a filling of a thermal energy storage composition comprising an intimate mixture of (a) a thermal energy storage compound that is a hydrate and that has a transition temperature at which the hydrate passes from a first energy state in which it is a solid to a second, less hydrated, energy state in which it comprises solid and liquid phases and (b) a solid, water swellable, water insoluble, thermally conducting, cross-linked polymer that is capable of reversibly absorbing and desorbing water of hydration of the said hydrate while remaining as solid, the improvement comprising forming the composition by blending particles of the said hydrate in its first energy state with the said polymer in the form of substantially dry particles up to 1 mm in size, and with substantially the amount of water required to provide the said first energy state of the hydrate wherein the water that is present during blending is chemically combined with the hydrate as water of hydration, and filling the composition into the vessel at a temperature below said transition temperature, whereby the polymeric material will prevent separation of the said solid and liquid phases of the hydrate in the vessel during reversible and repeated storage and release of thermal energy.

12. A method according to claim 11 in which the polymer particles are of polymer formed from ethylenically unsaturated monomers and the cross-linking agent is an ethylenically unsaturated cross-linking agent.

13. A method according to claim 12 in which the ethylenically unsaturated monomers comprise acrylic monomers.

14. A method according to claim 13 in which the thermal energy storage compound is a sodium pyrophosphate 15. A method according to claim 13 in which the thermal energy storage compound is a sodium thiosulphate hydrate.

16. A method according to claim 11 in which the hydrate is sodium pyrophosphate hydrate or sodium thiosulphate hydrate.

17. A method according to claim 11 in which the substantially dry particles are 0.05 to 1 mm in size.

18. A method according to claim 11 in which the amount of polymer, based upon the combined weight of polymer and hydrate is at least 1% and below 25% by weight.

19. A method according to claim 18 in which the amount of polymer is from 5 to 15% by weight.

20. A method according to claim 19 in which the amount of polymer is 5 to 10% by weight.

* * * * *